(12) United States Patent
Domhoff

(10) Patent No.: US 12,358,344 B2
(45) Date of Patent: Jul. 15, 2025

(54) REMOVABLE COVER FOR AN AIR CONDITIONER UNIT

(71) Applicant: Haier US Appliance Solutions, Inc., Wilmington, DE (US)

(72) Inventor: Joseph Domhoff, Shelbyville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 90 days.

(21) Appl. No.: 18/355,234

(22) Filed: Jul. 19, 2023

(65) Prior Publication Data

US 2025/0026173 A1  Jan. 23, 2025

(51) Int. Cl.
*B60H 1/00* (2006.01)
(52) U.S. Cl.
CPC ..... *B60H 1/00535* (2013.01); *B60H 1/00364* (2013.01); *B60H 2001/00235* (2013.01)
(58) Field of Classification Search
CPC ............ B60H 1/00535; B60H 1/00364; B60H 2001/00235
See application file for complete search history.

(56) References Cited

U.S. PATENT DOCUMENTS

| 5,315,842 | A | * | 5/1994 | Bolton | F24F 1/027 |
| | | | | | 62/262 |
| 6,082,127 | A | * | 7/2000 | Correa | F24F 13/20 |
| | | | | | 62/297 |
| 9,233,465 | B2 | | 1/2016 | Lai | |
| 10,359,790 | B2 | | 7/2019 | Novotny et al. | |
| 2009/0126384 | A1 | * | 5/2009 | Khan | F25D 23/00 |
| | | | | | 29/700 |
| 2021/0061060 | A1 | * | 3/2021 | Meda | B60H 1/00535 |
| 2022/0009305 | A1 | * | 1/2022 | Henderson | B60H 1/00364 |

FOREIGN PATENT DOCUMENTS

CN  217274796 U  8/2022
WO  WO2019206017 A1  10/2019

* cited by examiner

*Primary Examiner* — David J Teitelbaum
(74) *Attorney, Agent, or Firm* — Dority & Manning, P.A.

(57) ABSTRACT

An air conditioner for a recreational vehicle is provided. The air conditioner includes an indoor base panel configured to mount to the ceiling of the recreational vehicle. The indoor base panel includes a first flexible latch on a first side of the indoor base panel and a second flexible latch on a second side of the indoor base panel opposite the first side. The air conditioner also includes an indoor grille removably coupled to the indoor base panel by the first flexible latch and the second flexible latch.

16 Claims, 13 Drawing Sheets

REMOVABLE COVER FOR AN AIR CONDITIONER UNIT

FIELD OF THE INVENTION

The present subject matter relates generally to air conditioners in recreational vehicles, and more particularly, to removable covers for such air conditioner units.

BACKGROUND OF THE INVENTION

Certain recreational vehicles include an air conditioning system, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

Air is circulated between the passenger compartment and the RVAC through one or more grille assemblies mounted at the ceiling of the passenger compartment. Such grille assemblies generally include a cosmetic cover which obscures and protects internal components of the RVAC, such as components mounted to or above the ceiling of the passenger compartment. Some components, for example, an air filter or fasteners, may be positioned above the cover, yet it may be desirable to access such components, e.g., to replace the air filter or adjust the fasteners, etc. However, access to such components may be difficult, such as removal of the cover in order to access such components may be difficult, such as due to the height at which the cover may be mounted, e.g., at the ceiling.

Accordingly, an improved air conditioner unit would be useful. More specifically, a recreational vehicle air conditioner with features for easier access to internal components thereof would be particularly beneficial.

BRIEF DESCRIPTION OF THE INVENTION

Aspects and advantages of the invention will be set forth in part in the following description, or may be apparent from the description, or may be learned through practice of the invention.

In one exemplary aspect of the present disclosure, a recreational vehicle is provided. The recreational vehicle defines a passenger compartment therein. The recreational vehicle also defines a lateral direction, a transverse direction and a vertical direction. The lateral direction, the transverse direction and the vertical direction are mutually perpendicular. The recreational vehicle includes a ceiling defining an upper boundary of the passenger compartment along the vertical direction. The ceiling further defines an opening into the passenger compartment. The recreational vehicle also includes a recreational vehicle air conditioner. The recreational vehicle air conditioner includes an indoor cover above the ceiling along the vertical direction. The indoor cover defines an indoor portion and an outdoor portion. The recreational vehicle air conditioner also includes an outdoor heat exchanger and an outdoor fan disposed in the outdoor portion and an indoor heat exchanger and an indoor fan disposed in the indoor portion. The recreational vehicle air conditioner further includes an indoor base panel mounted to the ceiling. The indoor base panel includes a first flexible latch on a first side of the indoor base panel and a second flexible latch on a second side of the indoor base panel opposite the first side. The recreational vehicle air conditioner also includes an indoor grille removably coupled to the indoor base panel by the first flexible latch and the second flexible latch.

In another exemplary aspect of the present disclosure, a recreational vehicle air conditioner is provided. The recreational vehicle air conditioner defines a lateral direction, a transverse direction, and a vertical direction. The lateral direction, the transverse direction, and the vertical direction are mutually perpendicular. The recreational vehicle air conditioner includes an indoor cover configured to mount to a recreational vehicle above the ceiling of the recreational vehicle. The indoor cover defines an indoor portion and an outdoor portion. The recreational vehicle air conditioner also includes an outdoor heat exchanger and an outdoor fan disposed in the outdoor portion and an indoor heat exchanger and an indoor fan disposed in the indoor portion. The recreational vehicle air conditioner further includes an indoor base panel configured to mount to the ceiling. The indoor base panel includes a first flexible latch on a first side of the indoor base panel and a second flexible latch on a second side of the indoor base panel opposite the first side. The recreational vehicle air conditioner also includes an indoor grille removably coupled to the indoor base panel by the first flexible latch and the second flexible latch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
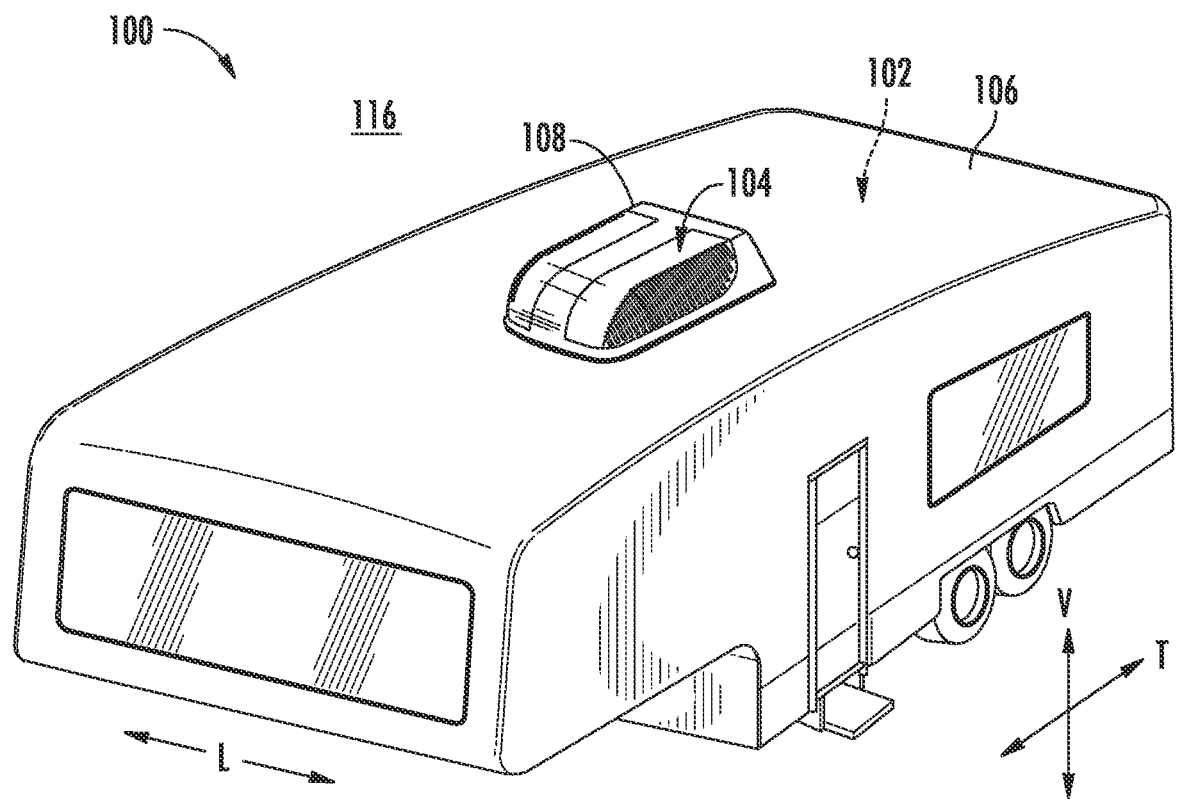
FIG. 1 provides a perspective view of a recreational vehicle according to one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error. When used in the context of an angle or direction, such terms include within ten degrees greater or less than the stated angle or direction. For example, "generally vertical" includes directions within ten degrees of vertical in any direction, e.g., clockwise or counterclockwise.

FIG. 1 provides a perspective view of an exemplary recreational vehicle 100 in accordance with the present disclosure. As may be seen in FIG. 1, the recreational vehicle 100 generally defines a vertical direction V, a lateral direction L, and a transverse direction T, each of which is mutually perpendicular, such that an orthogonal coordinate system is generally defined. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment 102 is desirable.

Accordingly, an air conditioning system or air conditioner unit 104 may be mounted on recreational vehicle 100 to provide cooled air to the passenger compartment 102. Air conditioner unit 104 is typically mounted to an outside surface 106 of recreational vehicle 100. This arrangement is desirable because a byproduct of operation of air conditioner unit 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioner unit 104 may be mounted on an outer surface 106, such as the top of recreational vehicle 100. Also as shown in FIG. 1, air conditioner unit 104 may include a top cover (outdoor cover) or outer grille 108 that is positioned over the working components of air conditioner unit 104, e.g., to protect such working components from rain, wind, debris, etc. Although an exemplary recreational vehicle is illustrated, it should be appreciated that air conditioner 104 may be used in or with any suitable recreational vehicle.

Figure 2:
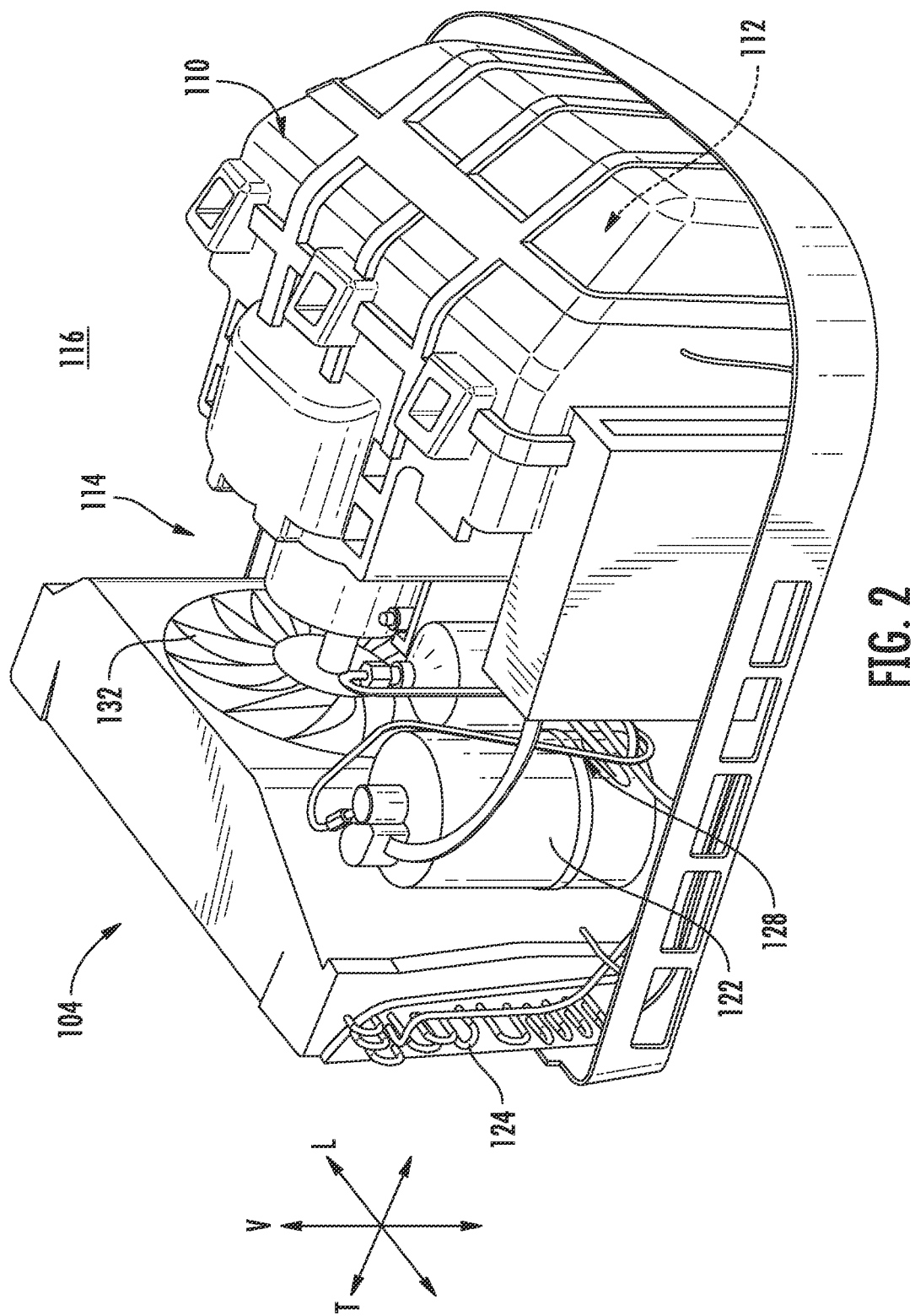
FIG. 2 provides a perspective view of a recreational vehicle air conditioner (RVAC) that may be used with the exemplary recreational vehicle of FIG. 1, with an outdoor cover removed for clarity.
Figure 3:
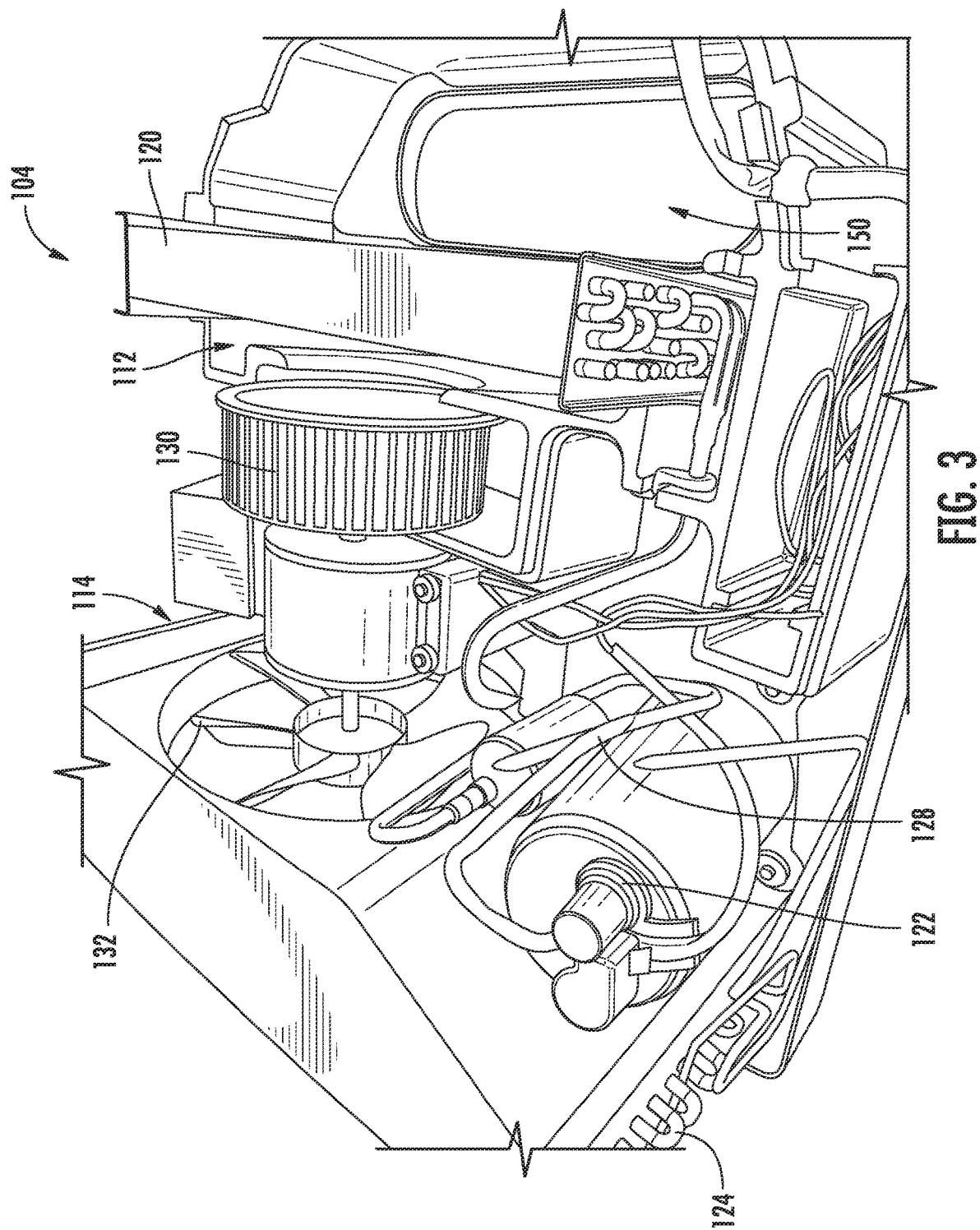
FIG. 3 provides a perspective view of the exemplary RVAC of FIG. 2 with an indoor cover removed for clarity.
Figure 4:
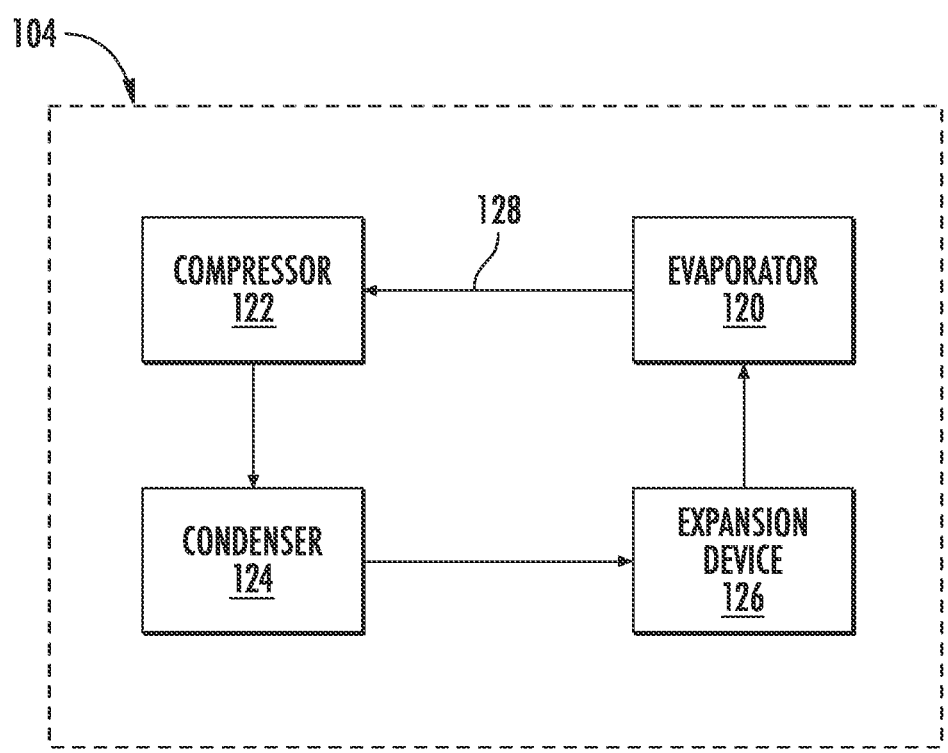
FIG. 4 provides a schematic view of an air conditioner unit according to one or more exemplary embodiments of the present disclosure.

Referring now generally to FIGS. 2 through 4, the operation of air conditioner unit 104 will be described in more detail according to exemplary embodiments of the present subject matter. In this regard, FIG. 2 illustrates a top, perspective view of air conditioner 104 of recreational vehicle 100 with outer grille 108 removed to reveal internal working components of air conditioner 104. As illustrated, air conditioner unit 104 generally includes an indoor bulkhead or indoor cover 110 that divides air conditioner unit 104 between an indoor portion and an outdoor portion, such as in a packaged terminal air conditioner unit (PTAC) or a split heat pump system. Specifically, indoor cover 110 defines an indoor air plenum 112 and an outdoor air plenum 114. In this regard, indoor cover 110 generally shields the indoor components of air conditioner unit 104 from the outdoor environment 116.

Referring now also to FIG. 3, indoor cover 110 is removed to reveal additional working components of air conditioner unit 104. In addition, FIG. 4 illustrates a schematic view of air conditioner unit 104. Relevant components of air conditioner unit 104 will now be described. It should be understood that air conditioner unit 104 includes various heat pump components, such as a sealed system, for treating air within an interior of an associated recreational vehicle 100. Such components are well understood by those skilled in the art and a description of such components is omitted for the sake of brevity.

In this regard, for example, air conditioner unit 104 includes refrigerant circulating between evaporator 120, compressor 122, condenser 124, and expansion device 126, as shown in the refrigeration loop 128 of air conditioner unit 104 in FIGS. 2 through 4. Refrigerant, also known as coolant, carries heat from the passenger compartment 102 of recreational vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner unit 104 may include an indoor fan 130, such as a blower fan 130 as illustrated in FIG. 3, configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioner unit 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

Figure 5:
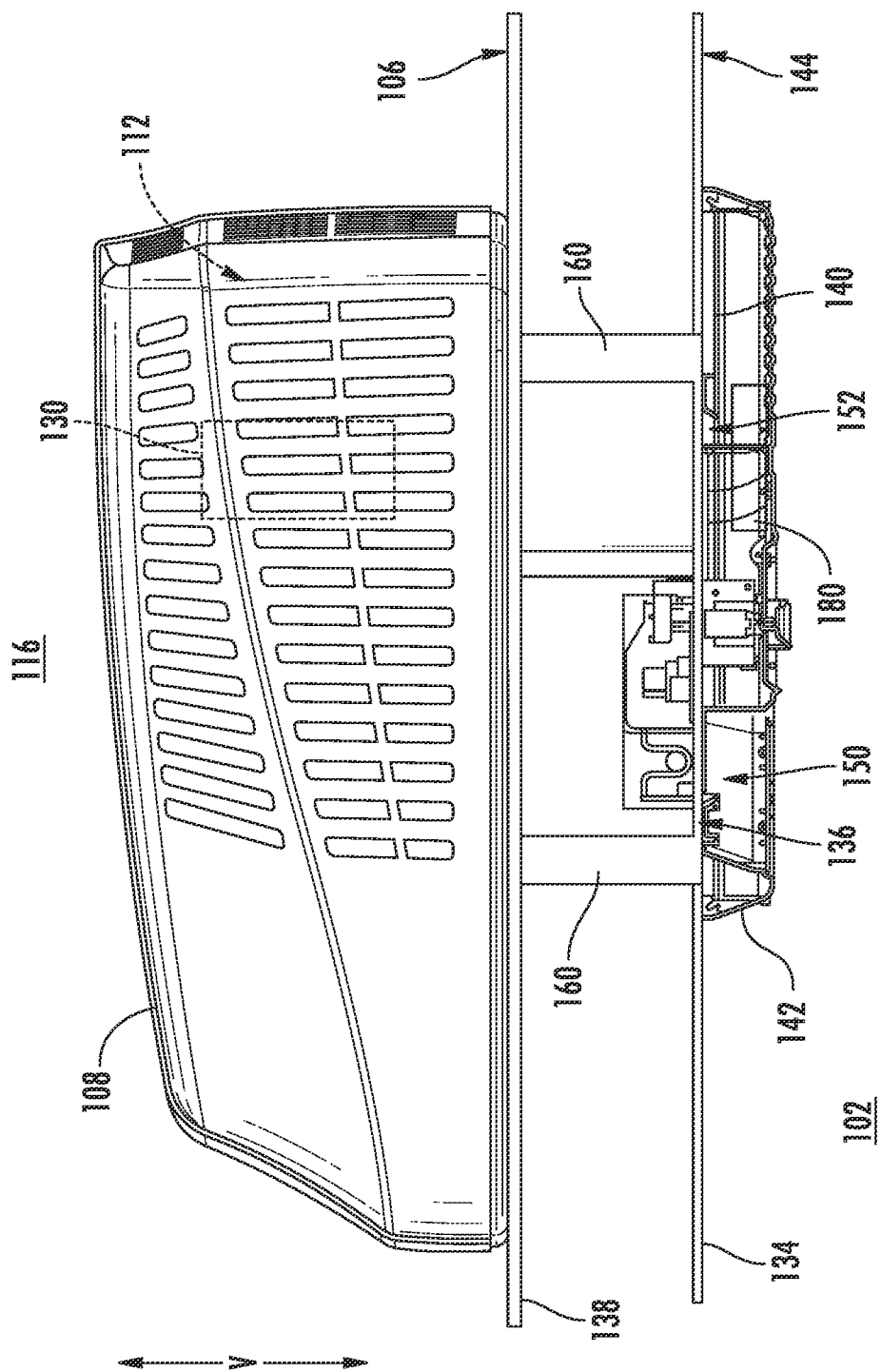
FIG. 5 provides a schematic side view of the exemplary air conditioner unit of FIG. 2 mounted on a roof and ceiling of a recreational vehicle according to one or more exemplary embodiments of the present subject matter.

FIG. 5 provides a side schematic view of air conditioner unit 104 mounted atop of recreational vehicle 100. As explained above, air conditioner unit 104 is mounted to outer surface 106 of the recreational vehicle 100, e.g., with one portion of the air conditioner unit 104 mounted on a roof 138 of the recreational vehicle 100, a second portion of the air conditioner unit 104 mounted on a ceiling 134 of the recreational vehicle 100, and additional components of the air conditioner unit 104 are positioned between the roof 138 and the ceiling 134. As illustrated in FIG. 5, air conditioner 104 is seated over an opening 136 within ceiling 134, e.g., to cover opening 136, such as with an indoor base panel 140 and an indoor grille 142 of air conditioner unit 104 covering the opening 136. The indoor base panel 140 may be mounted within passenger compartment 102 by passing a plurality of bolts or other suitable mechanical fasteners through indoor base panel 140.

The air conditioner unit 104 may further include an indoor grille 142 that is positioned over, around, and/or below the indoor base panel 140. For example, indoor grille 142 may be mounted on and/or flush with inner surface 144 of ceiling 134 of recreational vehicle 100, e.g., within an interior or passenger compartment 102 of recreational vehicle 100. For example, indoor grille 142 may be secured directly to indoor base panel 140, e.g., the indoor grille 142 may snap on to the indoor panel 140 via one or more flexible latches, as will be described in more detail below. Accordingly, indoor grille 142 may be coupled to indoor base panel 140 when indoor grille 142 is in an installed position, and the indoor grille 142 may surround the indoor base panel 140 on five sides, e.g., on all four sides within a horizontal plane and on a fifth side below the indoor base panel 140 along the vertical direction V. Thus, the indoor grille 142 may obscure the indoor base panel 140 and other components of the RVAC above the indoor griller 142 to provide a smooth aesthetic appearance to the RVAC when observed from within the passenger compartment 102.

Indoor grille 142 may overlay and hide components of air conditioner unit 104 to provide a pleasant cosmetic appearance for air conditioner unit 104 when viewed from passenger compartment 102. In addition, indoor grille 142 may facilitate filtering air circulated through the air conditioner 104. For example, indoor grille 142 may also include, e.g., louvers, perforated sections, and/or other air flow apertures, to allow air to flow through indoor grille 142. Indoor grille 142 may also serve as a removable filter cover, e.g., a filter 180 may be positioned above the indoor grille 142 and below the indoor base panel 140. For example, the filter 180 may be or include a filter medium, such as a concertinaed or pleated fabric filter, fiberglass filter, etc., that filters air entering air conditioner unit 104 at air inlet 150.

For example, indoor grille 142 and indoor panel 140 may include an air inlet 150 and an air outlet 152 through which air circulates between the passenger compartment 102 of the recreational vehicle 100 and the indoor air plenum 112 (FIGS. 2 and 3) of the air conditioner unit 104. Such air may also sometimes be referred to as "indoor air," e.g., as distinct from outdoor air which circulates through the outdoor portion 114 of the air conditioner unit 100. Air inlet and outlet 150, 152 may be separate from each other on indoor panel 140. Relatively warm air from within passenger compartment 102 of recreational vehicle 100 may flow through indoor grille 142 and indoor base panel 140 via air inlet 150, and such air may be treated (e.g., heated or cooled) by a sealed system of air conditioner 104, and in particular the indoor heat exchanger (evaporator) 120 thereof (see, e.g., FIGS. 2 through 4). The resultant treated air may then flow back into the passenger compartment 102 through indoor grille 142 and indoor base panel 140 via air outlet 152.

In some embodiments, the air conditioner unit 104 may provide a cooling capacity of about twelve thousand British Thermal Units (BTU) per hour (12 kBTU/hr) or more, such as about 13.5 kBTU/hr or more, such as about 15 kBTU/hr or more, such as about 18 kBTU/hr. Also, the air conditioner unit 104 may provide an air flow rate within the passenger compartment of about one hundred cubic feet per minute (CFM) or more, such as about 150 CFM or more, such as about 200 CFM or more, such as about 300 CFM. The air conditioner unit 104 may be configured to and/or operable to provide such cooling and/or air flow rates at least in part by the size and location of the indoor fan 130. As mentioned above and as shown in FIG. 3, the indoor fan 130 may be a blower fan. In particular, the blower fan 130 may include a six inch (6") or larger blower wheel, such as an eight inch (8") or larger blower wheel, such as a ten inch (10") or larger blower wheel. The blower wheel may be positioned directly above the opening 136.

In some embodiments, e.g., as illustrated in FIG. 5, the air conditioner unit 104 may be part of a ducted system. As illustrated, e.g., in FIG. 5, the air conditioner unit 104 may include a sleeve 160 which extends between the roof 138 of the recreational vehicle 100 and the ceiling 134 of the recreational vehicle 100, such as from the outer grille 108 of the air conditioner unit 104 to the indoor panel 140 or indoor grille 142.

In embodiments where the air conditioner unit 104 is a part of a ducted system, one or more ducts (not shown) may be included within the recreational vehicle 100, such as between the roof 138 and the ceiling 134, to distribute chilled or otherwise treated air to disparate areas within the passenger compartment 102, e.g., to additional outlets spaced apart horizontally from the sleeve 160, where "horizontally" refers to generally along the lateral direction L, the transverse direction T, or both, and/or within a horizontal plane that is perpendicular to the vertical direction V and is defined by the lateral direction L and the transverse direction T (it being understood that such outlets are spaced apart at least horizontally and may also be vertically spaced apart from the sleeve 160 and/or air conditioner unit 104).

In ducted embodiments, the sleeve 160 may include one or more duct connecting ports. Those of ordinary skill in the art will recognize that the duct connecting port or ports may comprise a short stub or nipple sized to be coupled with a correspondingly shaped duct, e.g., the connecting port(s) may have a rectangular cross-sectional shape for mating with (e.g., being received snugly within) a rectangular shaped duct.

The indoor grille 142 may be removably latched on to the indoor base panel 140. For example, the indoor grille 142 may be removed to access the filter 180, such as for periodic replacement of the filter 180, or to access the fasteners by which the indoor base panel 140 and/or other components above the ceiling 134 are mounted, or for other reasons.

Figure 6:
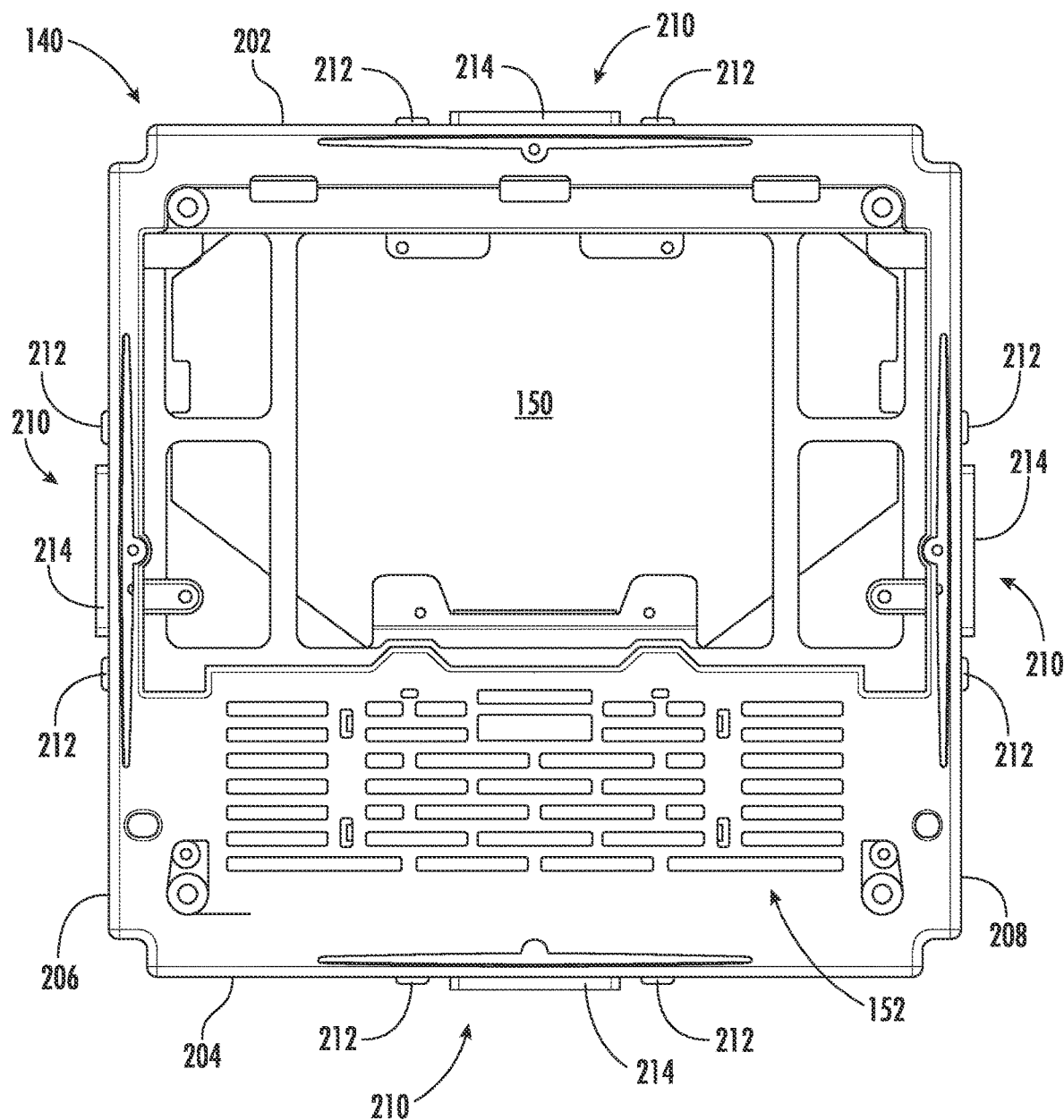
FIG. 6 provides a bottom view of an exemplary indoor base panel which may be incorporated into an air conditioner unit such the exemplary air conditioner unit of FIGS. 1-5.
Figure 7:
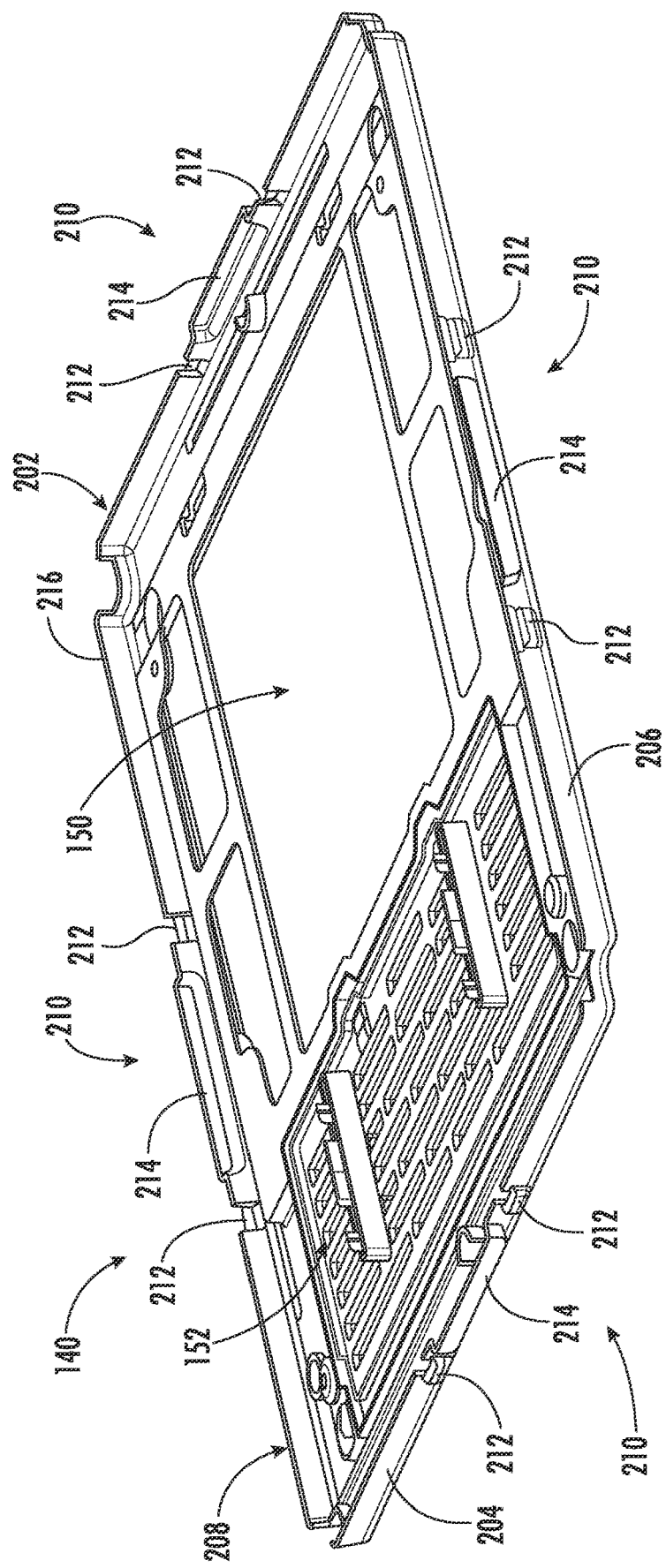
FIG. 7 provides a top perspective view of the exemplary indoor base panel of FIG. 6.

As may be seen, e.g., in FIGS. 6 and 7, the indoor base panel 140 may include multiple sides, such as four sides, and the four sides may include two pairs of sides which are approximately perpendicular to each other, such as a front side 202 and a back side 204 which are approximately parallel to each and are each approximately perpendicular to a left side 206 and a right side 208, where the left side 206 and the right side 208 are also approximately perpendicular to each other. In various embodiments, some or all of the sides of the indoor base panel 140 may include an in integrated release mechanism 210. For example, the integrated release mechanism 210 may be integrally joined to the one or more sides of the indoor base panel 140. The integrated release mechanism 210 may be provided in pairs on opposite sides of the indoor base panel 140, such as a pair of integrated release mechanisms 210 on the left side 206 and the right side 208 and/or a pair of integrated release mechanisms 210 on the front side 202 and the back side 204. Each integrated release mechanism 210 may be positioned at approximately the middle of each respective side on which the integrated release mechanism is provided. As will be described in more detail below, each integrated release mechanism 210 may include at least one flexible latch 212 and a release bar 214, such as a central release bar 214 with two latches 212 symmetrically disposed on opposite sides of the release bar 214. As may be seen in FIG. 7 in particular, the indoor base panel 140 may include a top edge 216 which extends around an entire perimeter of the indoor base panel 140 and defines an uppermost extent of the indoor base panel 140. In such embodiments, each integrated release mechanism 210 may be positioned at the top edge 216, e.g., an uppermost edge of the respective side of the indoor base panel 140, such as each integrated release mechanism 210 may be positioned on the respective side such that the uppermost edge of the integrated release mechanism 210 is approximately aligned with the top edge 216 of the indoor base panel 140, where "approximately aligned with the top edge" is understood as including offset by no more than ten percent (10%) of a vertical dimension, e.g., height, of the indoor base panel 140.

The indoor base panel 140, such as the integrated release mechanism(s) 210 and the flexible latch(es) 212 thereof, may be made of any suitable material which provides flexibility to permit the latch 212 to flex inwards (towards a center of the indoor base panel 140) during installation of the indoor grille 142 and to snap back into a neutral (unflexed) position when the indoor grille 142 reaches the installed position. For example, the indoor base panel 140, including the integral flexible latches 212 integrated therein, may be formed of a flexible resilient plastic material, such as a high-impact polystyrene.

Figure 8:
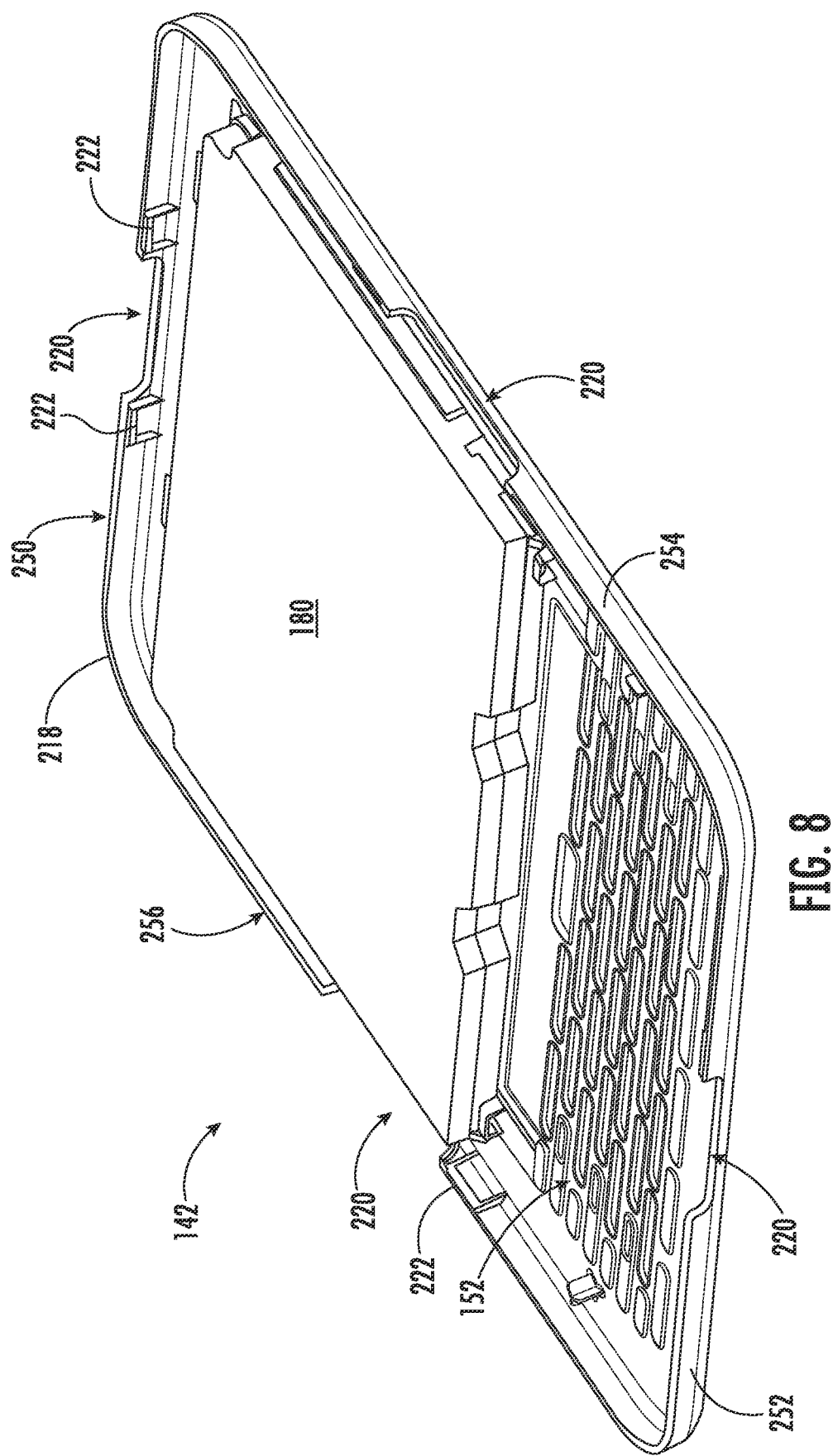
FIG. 8 provides a top perspective view of an exemplary indoor grille which may be incorporated into an air conditioner unit such the exemplary air conditioner unit of FIGS. 1-5.

As may be seen, e.g., in FIG. 8, the filter 180 may be positioned on and above the indoor grille 142. The indoor grille 142 may include a top edge 218, e.g., extending around the full perimeter of the indoor grille 142 at the uppermost extent of the indoor grille 142 along the vertical direction V when the indoor grille 142 is in an installed position or is otherwise oriented in the same direction as when in the installed position. The top edge 218 may extend continuously around a perimeter of the indoor grille 142. For example, as illustrated in FIG. 5, when the indoor grille 142 is in the installed position the top edge 218 of the indoor grille 142 may be in contact with the ceiling 134 and/or may be proximate to the ceiling 134, such as the top edge 218 of the indoor grille 142 may be most proximate to the ceiling 134 as compared to all other parts of the indoor grille 142 when the indoor grille 142 is in the installed position coupled to the indoor base panel 140.

Also as may be seen in FIG. 8, the indoor grille 142 may include a number of recesses 220, such as a number of recesses 220 equal to the number of integrated release mechanism 210 in the indoor base panel 140. For example, the recesses 220 may be defined in the top edge 218 of the indoor grille 142 at one or more sides of the indoor grille 142. The indoor grille 142 may include four sides which generally correspond to and are configured to align with the sides of the indoor base panel 140 which are described above with reference to FIGS. 6 and 7. For example, the indoor grille 142 may include a front side 250 that aligns with and is most proximate to the front side 202 of the indoor base panel 140 when the indoor grille 142 is in the installed position, a back side 252 that aligns with and is most proximate to the back side 204 of the indoor base panel 140 when the indoor grille 142 is in the installed position, a right side 254 that aligns with and is most proximate to the right side 206 of the indoor base panel 140 when the indoor grille 142 is in the installed position, and a left side 256 that aligns with and is most proximate to the left side 208 of the indoor base panel 140 when the indoor grille 142 is in the installed position. Thus, for example, the indoor grille 142 may include a first recess 220 in a first side of the indoor grille 142 that corresponds to a first side of the indoor base panel 140, such as any one of the front, back, left, and/or right sides of the indoor base panel 140 and indoor grille 142.

Figure 9:
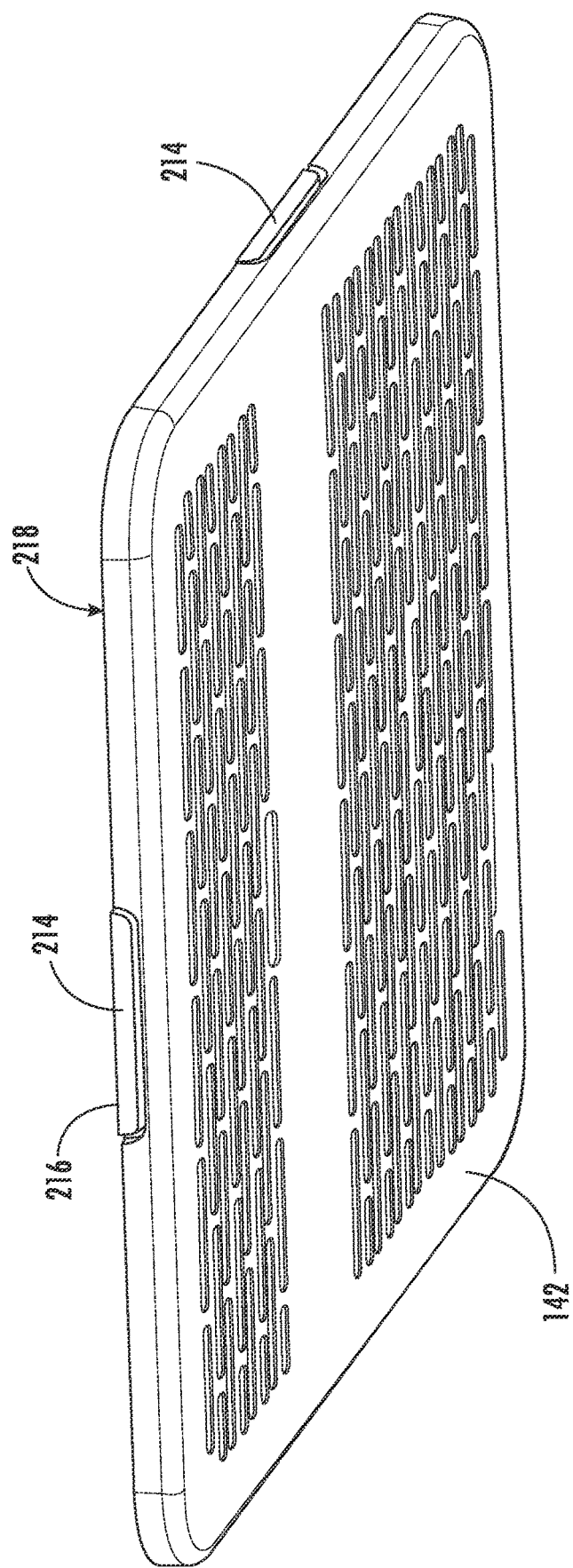
FIG. 9 provides a bottom perspective view of the indoor grille of FIG. 8 mounted on the indoor base panel of FIG. 6 according to one or more exemplary embodiments of the present disclosure.
Figure 10:
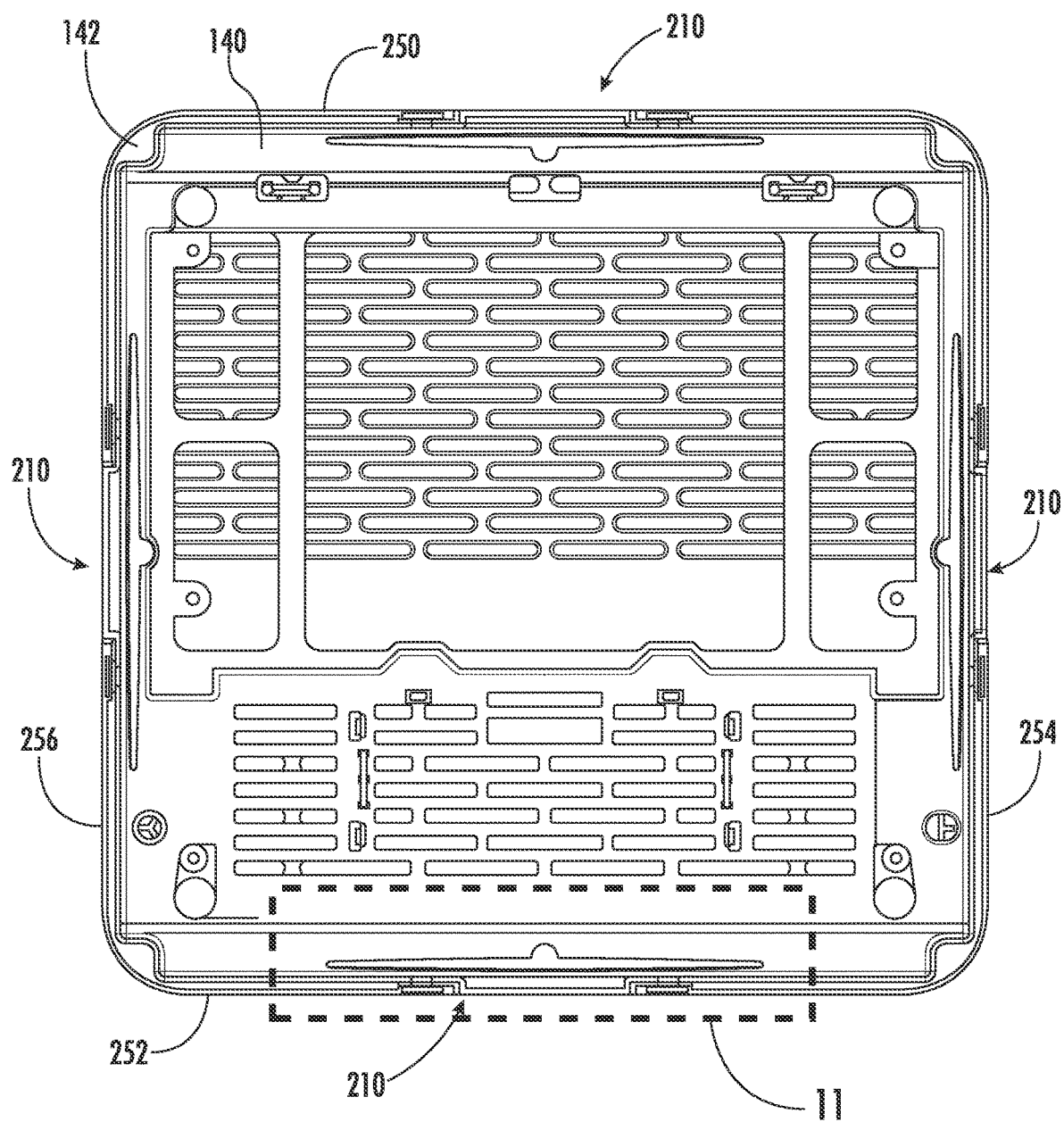
FIG. 10 provides a top view of the exemplary indoor base panel and indoor grille.

FIG. 9 provides a perspective view of the indoor grille 142 in the installed position coupled to the indoor base panel 140 and retained in the installed position by the flexible latches 212 on the indoor base panel 140. FIG. 10 provides a top view looking down at the indoor base panel 140 and indoor grille 142, e.g., at a side of the indoor base panel 140 and indoor grille 142 that would face towards or abut the ceiling 134, where the ceiling 134 is not illustrated in FIG. 10. When the indoor grille 142 is in the installed position, e.g., coupled to the indoor base panel 140 by the flexible latches 212, each release bar 214 of the indoor base panel 140 is positioned in a corresponding recess 220 of the indoor grille 142. Accordingly, the release bars 214 may be accessible in order to actuate the release bars 214 and release the indoor grille 142 from the installed position.

Figure 11:
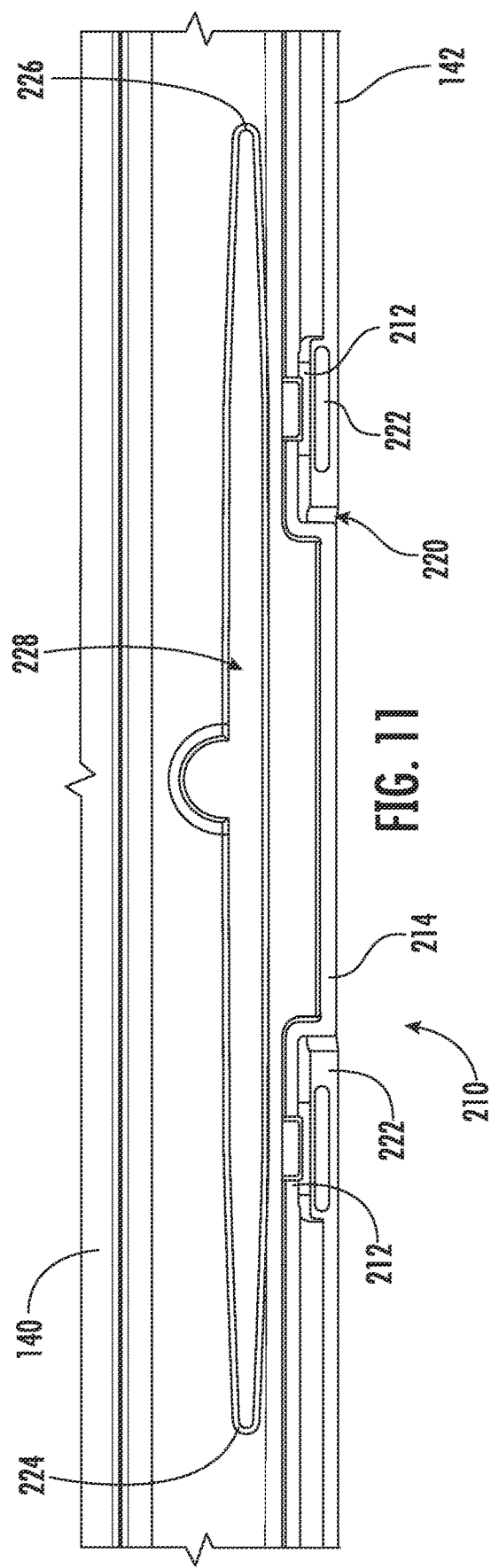
FIG. 11 is an enlarged portion of FIG. 10.

FIG. 11 provides an enlarged view of a portion of FIG. 10, e.g., the portion indicated by rectangle 11 in FIG. 10, which is enlarged to more clearly illustrate details of an exemplary integrated release mechanism 210 of the indoor base panel 140 and recess 220 of the indoor grille 142. It is to be understood that each integrated release mechanism 210 and recess 220, e.g., both or all four in various embodiments, is substantially the same (apart from the directional orientation with regards to facing up, down, left, or right), such that the particulars of the exemplary integrated release mechanism 210 and recess 220 illustrated in FIG. 11 and described herein are also applicable to every other integrated release mechanism 210 and recess 220.

As may be seen, e.g., in FIG. 11, the integrated release mechanism 210 may include a release bar 214 in the middle of the integrated release mechanism 210 with a flexible latch 212 disposed on each side of the release bar 214. Each flexible latch 212 may be engaged with a respective tab 222 of the indoor grille 142. The tabs 222 of the indoor grille 142 will be described further below with reference to FIGS. 12 and 13. The integrated release mechanism 210 may be integrally joined with the indoor base panel 140 at a side of the indoor base panel 140, such as the back side 204 as illustrated in FIG. 11. For example, the integrated release mechanism 210 may be integrally joined with the indoor base panel 140 at a first end 224 of the integrated release mechanism 210 and at a second end 226 of the integrated release mechanism 210 opposite the first end 224. The integrated release mechanism 210 may be spaced apart from the remainder of the indoor base panel 140 between the first end 224 of the integrated release mechanism 210 and the second end 226 of the integrated release mechanism 210, such that a gap 228 is defined inward of the release bar 214 of the integrated release mechanism 210. Thus, the integrated release mechanism 210 may be configured to deflect inward into the gap 228 to release the flexible latches 212 of the integrated release mechanism 210, e.g., to disengage each flexible latch 212 of the indoor base panel 140 from the respective tab 222 of the indoor grille 142.

Figure 12:
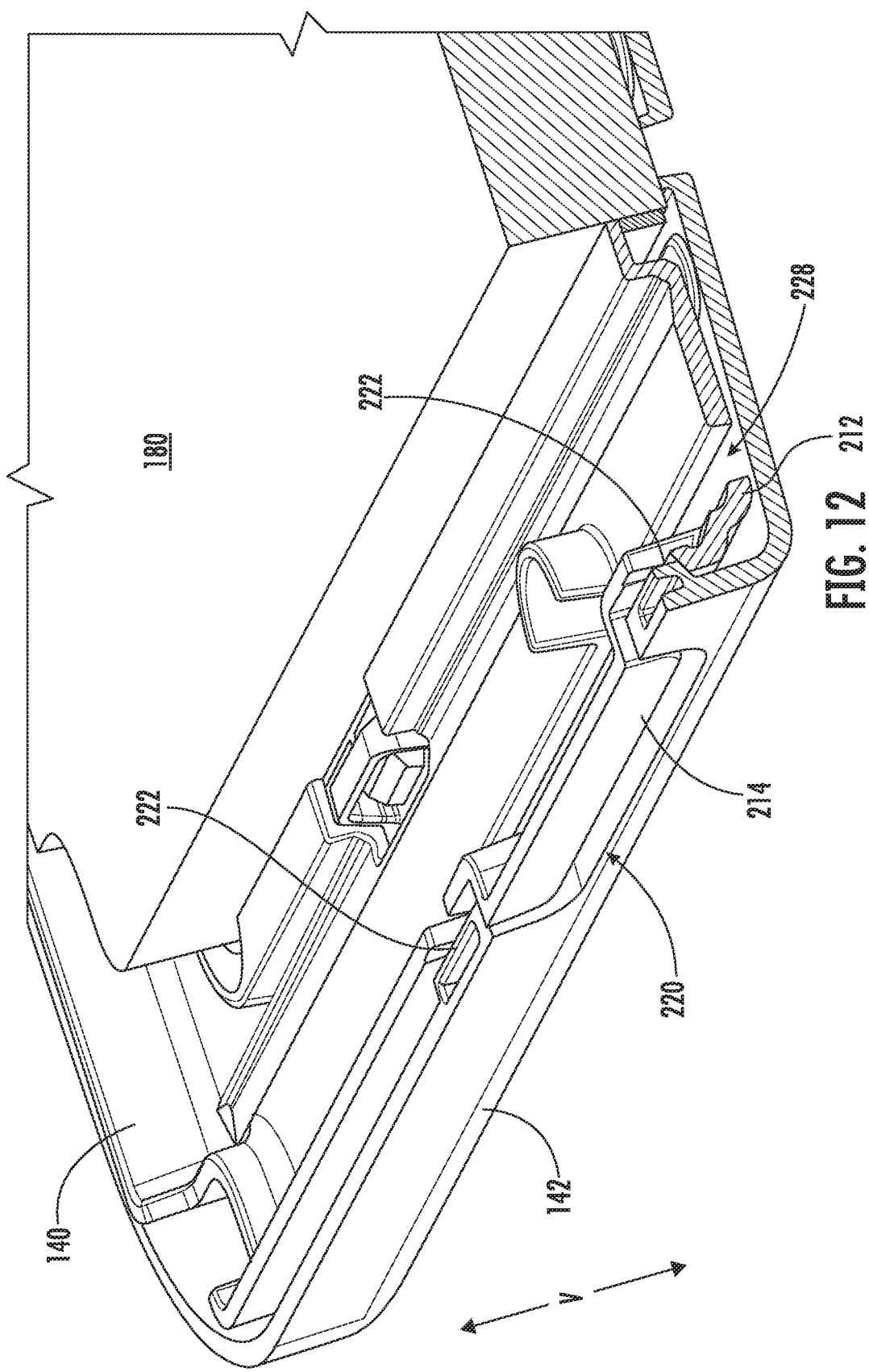
FIG. 12 provides a sectioned perspective view of the exemplary indoor base panel and indoor grille.
Figure 13:
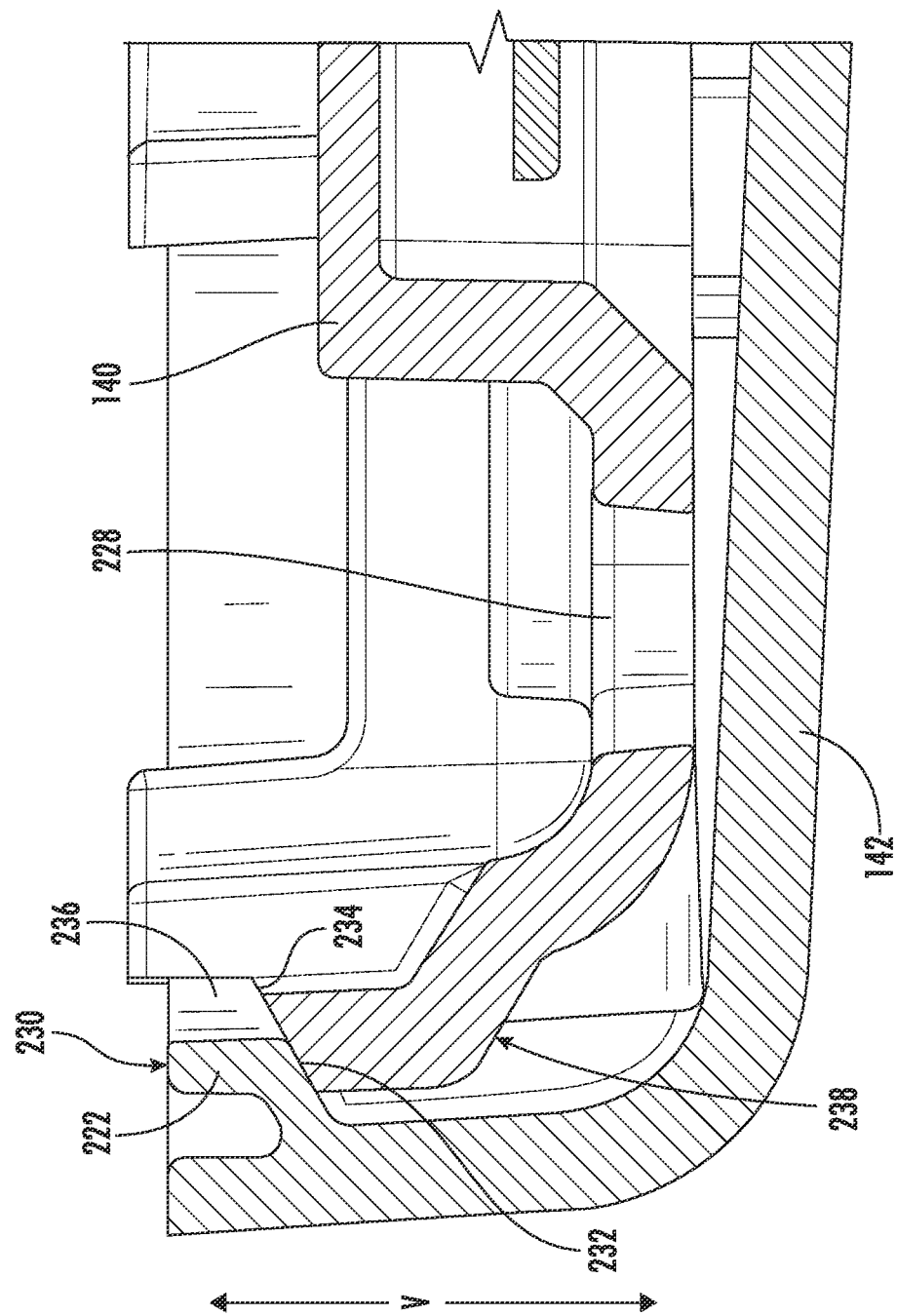
FIG. 13 provides a side section view of exemplary indoor base panel and indoor grille.

As may be seen, e.g., in FIGS. 12 and 13, each flexible latch 212 may include a curved face 238. The curved face 238 may be configured to engage a respective inner surface 230 of the indoor grille 142, such as an inner top surface of the respective tab 222, when the indoor grille 142 is in an intermediate position, e.g., a position between fully removed from the indoor base panel 140 and the installed position, whereby continued upward motion of the indoor grille 142 towards the installed position causes surface 230 of the indoor grille 142 to bear on the curved face 238 of the indoor base panel 140, thereby urging the flexible latch 212 inwards, e.g., towards a center of the indoor base panel 140, such into the gap 228 between the integrated release mechanism 210 and the remainder of the indoor base panel 140, permitting the indoor grille 142 to be installed over and onto the indoor base panel 140. When the indoor grille 142 reaches the installed position, e.g., when an inward face 236 of the tab 222 is above an angled upper face 232 of the flexible latch 212, the flexible latch 212 may then snap into place, thereby engaging the tab 222 and locking the indoor grille 142 in the installed position.

In some embodiments, the flexible latch 212 may include an angled upper face 232 and the tab 222 of the indoor grille 142 may include an angled inner face 234. The angled inner face 234 on the tab 222 of the indoor grille 142 may be configured to engage with the angled upper face 232 of the flexible latch 212, e.g., as may be seen in FIG. 13, when the indoor grille 142 is in the installed position, such that the indoor grille 142 may be retained in the installed position, e.g., on and coupled to the indoor base panel 140, by the interaction of the tab 222 and the flexible latch 212, such as by the mutual engagement of the angled upper face 232 and the angled inner face 234.

The release bar 214 of each integrated release mechanism 210 may be sized and positioned for convenient access and actuation. As mentioned above, the release bar 214 may be located at or near the top of the indoor base panel 140 and indoor grille 142, such that a user reaching up from below to disengage the indoor grille 142 may easily locate the release bar 214. Additionally, the release bar 214 may be sized for leverage such that a minimal inward force applied to the release bar 214 is sufficient to cause the flexible latches 212 connected to the release bar 214 to flex inward and thereby release the flexible latches 212 from the corresponding tabs 22. The release bar 214 may also be sized for ergonomics, such as sized to approximate a user's fingers, e.g., four fingers of average sized adult. Thus, the indoor grille 142 may be removed from the installed position, e.g., decoupled from the indoor base panel 140, by manipulating two release bars 214 at the same time, such as a pair of release bars 214 on opposite sides of the indoor grille 142 and indoor base panel 140. That is, a user may reach up with both hands and grasp the indoor grille 142 at two opposing recesses 220, and while so grasping the indoor grille 142, may also actuate the release bars 214 in each of the two opposing recesses 220. In embodiments where an integrated release mechanism 210 is provided on all four sides, the indoor grille 142 may be partially released by manipulating a first pair of opposing release bars 214, followed by manipulating the second pair of opposing release bars 214, such as releasing the integrated release mechanisms 210 on the front and back sides followed by releasing the integrated release mechanisms 210 on the right and left sides (or the reverse order, right and left followed by front and back, as another example)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recreational vehicle that defines a passenger compartment therein, the recreational vehicle defining a lateral direction, a transverse direction, and a vertical direction, wherein the lateral direction, the transverse direction, and the vertical direction are mutually perpendicular, the recreational vehicle comprising:
   a ceiling defining an upper boundary of the passenger compartment along the vertical direction, the ceiling further defining an opening into the passenger compartment;
   a recreational vehicle air conditioner, the recreational vehicle air conditioner comprising:
      an indoor cover above the ceiling along the vertical direction, the indoor cover defining an indoor portion and an outdoor portion;
      an outdoor heat exchanger and an outdoor fan disposed in the outdoor portion;
      an indoor heat exchanger and an indoor fan disposed in the indoor portion;
      an indoor base panel mounted to the ceiling, the indoor base panel comprising a first flexible latch on a first side of the indoor base panel and a second flexible latch on a second side of the indoor base panel opposite the first side;

an indoor grille removably coupled to the indoor base panel by the first flexible latch and the second flexible latch;
a first integrated release mechanism integrally joined with the indoor base panel at the first side, the first integrated release mechanism comprising a first release bar and the first flexible latch; and
a second integrated release mechanism integrally joined with the indoor base panel at the second side, the second integrated release mechanism comprising a second release bar and the second flexible latch,
wherein the first integrated release mechanism is integrally joined with the indoor base panel at a first end of the first integrated release mechanism and at a second end of the first integrated release mechanism, wherein the first integrated release mechanism is spaced apart from the remainder of the indoor base panel between the first end of the first integrated release mechanism and the second end of the first integrated release mechanism, whereby a gap is defined inward of the release bar of the first integrated release mechanism, the first integrated release mechanism configured to deflect inward into the gap to release the first flexible latch, wherein the second integrated release mechanism is integrally joined with the indoor base panel at a first end of the second integrated release mechanism and at a second end of the second integrated release mechanism, wherein the second integrated release mechanism is spaced apart from the remainder of the indoor base panel between the first end of the second integrated release mechanism and the second end of the second integrated release mechanism, whereby a gap is defined inward of the release bar of the second integrated release mechanism, the second integrated release mechanism configured to deflect inward into the gap to release the second flexible latch.

2. The recreational vehicle of claim 1, further comprising a third flexible latch on a third side of the indoor base panel, the third side of the indoor base panel between the first side and the second side, and a fourth flexible latch on a fourth side of the indoor base panel, the fourth side opposite the third side.

3. The recreational vehicle of claim 1, further comprising a third flexible latch on the first side of the indoor base panel and a fourth flexible latch on the second side of the indoor base panel.

4. The recreational vehicle of claim 1, wherein the first release bar is configured to actuate the first flexible latch between a lock position and a release position, and the second release bar is configured to actuate the second flexible latch between a lock position and a release position.

5. The recreational vehicle of claim 1, wherein the indoor grille comprises a top edge, the top edge of the indoor grille proximate the ceiling when the indoor grille is in an installed position coupled to the base panel, further comprising a first recess defined in the top edge of the indoor grille at a first side of the indoor grille, a second recess defined in the top edge of the indoor grille at a second side of the indoor grille, wherein the first release bar is positioned in the first recess when the indoor grille is in the installed position and the second release bar is positioned in the second recess when the indoor grille is in the installed position.

6. The recreational vehicle of claim 1, wherein the first flexible latch comprises a curved face and the second flexible latch comprises a curved face, the curved face of the first flexible latch and the curved face of the second flexible latch each configured to engage a respective inner surface of the indoor grille when the indoor grille is in an intermediate position, whereby the first flexible latch and the second flexible latch are urged inward as the indoor grille moves upward towards an installed position of the indoor grille.

7. The recreational vehicle of claim 1, wherein the first flexible latch comprises an angled upper face and the second flexible latch comprises an angled upper face, further comprising a first angled inner face of the indoor grille configured to engage with the angled upper face of the first flexible latch and a second angled inner face of the indoor grille configured to engage with the angled upper face of the second flexible latch.

8. A recreational vehicle air conditioner defining a lateral direction, a transverse direction, and a vertical direction, wherein the lateral direction, the transverse direction, and the vertical direction are mutually perpendicular, the recreational vehicle air conditioner comprising:
an indoor cover configured to mount to a recreational vehicle above a ceiling of the recreational vehicle, the indoor cover defining an indoor portion and an outdoor portion;
an outdoor heat exchanger and an outdoor fan disposed in the outdoor portion;
an indoor heat exchanger and an indoor fan disposed in the indoor portion;
an indoor base panel configured to mount to the ceiling of the recreational vehicle, the indoor base panel comprising a first flexible latch on a first side of the indoor base panel and a second flexible latch on a second side of the indoor base panel opposite the first side;
an indoor grille removably coupled to the indoor base panel by the first flexible latch and the second flexible latch, wherein the indoor grille comprises a top edge, the top edge of the indoor grille proximate the ceiling when the indoor grille is in an installed position coupled to the base panel;
a first recess defined in the top edge of the indoor grille at the first side;
a second recess defined in the top edge of the indoor grille at the second side;
a first release bar positioned in the first recess when the indoor grille is in the installed position; and
a second release bar positioned in the second recess when the indoor grille is in the installed position.

9. The recreational vehicle air conditioner of claim 8, further comprising a first integrated release mechanism integrally joined with the indoor base panel at the first side and a second integrated release mechanism integrally joined with the indoor base panel at the second side, the first integrated release mechanism comprising the first release bar and the first flexible latch, and the second integrated release mechanism comprising the second release bar and the second flexible latch.

10. The recreational vehicle air conditioner of claim 9, wherein the first integrated release mechanism is integrally joined with the indoor base panel at a first end of the first integrated release mechanism and at a second end of the first integrated release mechanism, wherein the first integrated release mechanism is spaced apart from the remainder of the indoor base panel between the first end of the first integrated release mechanism and the second end of the first integrated release mechanism, whereby a gap is defined inward of the release bar of the first integrated release mechanism, the first integrated release mechanism configured to deflect inward into the gap to release the first flexible latch, wherein the second integrated release mechanism is integrally joined with the indoor base panel at a first end of the second integrated release mechanism and at a second end of the second integrated release mechanism, wherein the second integrated release mechanism is spaced apart from the remainder of the indoor base panel between the first end of the second integrated release mechanism and the second end of the second integrated release mechanism, whereby a gap is defined inward of the release bar of the second integrated release mechanism, the second integrated release mechanism configured to deflect inward into the gap to release the second flexible latch.

11. The recreational vehicle air conditioner of claim 8, further comprising a third flexible latch on a third side of the indoor base panel, the third side of the indoor base panel between the first side and the second side, and a fourth flexible latch on a fourth side of the indoor base panel, the fourth side opposite the third side.

12. The recreational vehicle air conditioner of claim 8, further comprising a third flexible latch on the first side of the indoor base panel and a fourth flexible latch on the second side of the indoor base panel.

13. The recreational vehicle air conditioner of claim 8, wherein the first release bar is adjacent the first flexible latch on the first side of the indoor base panel, the first release bar is configured to actuate the first flexible latch between a lock position and a release position, the second release bar is adjacent the second flexible latch on the second side of the indoor base panel, and the second release bar is configured to actuate the second flexible latch between a lock position and a release position.

14. The recreational vehicle e-air conditioner of claim 8, wherein the first flexible latch is integrally formed with the indoor base panel and the second flexible latch is integrally formed with the indoor base panel.

15. The recreational vehicle air conditioner of claim 8, wherein the first flexible latch comprises a curved face and the second flexible latch comprises a curved face, the curved face of the first flexible latch and the curved face of the second flexible latch each configured to engage a respective inner surface of the indoor grille when the indoor grille is in an intermediate position, whereby the first flexible latch and the second flexible latch are urged inward as the indoor grille moves upward towards an installed position of the indoor grille.

16. The recreational vehicle air conditioner of claim 8, wherein the first flexible latch comprises an angled upper face and the second flexible latch comprises an angled upper face, further comprising a first angled inner face of the indoor grille configured to engage with the angled upper face of the first flexible latch and a second angled inner face of the indoor grille configured to engage with the angled upper face of the second flexible latch.

* * * * *